United States Patent [19]

Fields

[11] 4,028,076
[45] June 7, 1977

[54] CENTRIFUGAL AIR PRECLEANER FOR INTERNAL COMBUSTION ENGINES

[75] Inventor: Gerald S. Fields, Boulder, Colo.

[73] Assignee: Parma Industries, Inc., Longmont, Colo.

[22] Filed: Aug. 18, 1975

[21] Appl. No.: 605,345

[52] U.S. Cl. .................................. 55/394; 55/337; 55/426; 55/431; 55/459 B; 55/467

[51] Int. Cl.² ........................................ B01D 45/16

[58] Field of Search ......... 55/319, 337, 338, 385 B, 55/394, 395, 399, 426, 430, 431, 454, 456, 457, 458, 459 B, 459 L, 339, 467; 209/144

[56] References Cited

UNITED STATES PATENTS

| 325,521 | 9/1885 | Finch | 55/338 |
|---|---|---|---|
| 1,720,536 | 7/1929 | Young | 55/394 |
| 1,753,490 | 4/1930 | Whitmore | 55/394 |
| 2,139,736 | 12/1938 | Dorham | 55/394 |
| 2,747,687 | 5/1956 | Carter | 55/430 |
| 3,792,573 | 2/1974 | Borsheim | 55/337 |
| 3,907,529 | 9/1975 | Borsheim | 55/337 |

FOREIGN PATENTS OR APPLICATIONS 539,188    9/1941    United Kingdom ................ 55/337

*Primary Examiner*—Frank W. Lutter
*Assistant Examiner*—David L. Lacey
*Attorney, Agent, or Firm*—Leydig, Voit, Osann, Mayer & Holt, Ltd.

[57] ABSTRACT

An air precleaner for internal combustion engines having a central conduit for conducting precleaned air to the air intake of the engine. A housing is disposed around the central conduit and forms an air intake opening, an arcuate wall spaced radially outwardly from the conduit and substantially concentric therewith for conducting the incoming air stream from the intake opening around the conduit so that any dust in the air stream is collected along the housing wall by centrifugal action, and a dust outlet for discharging dust from the housing at the downstream end of the arcuate wall. The conduit forms clean air port near the downstream end of the arcuate wall for discharging clean air from the inner region of the space between the arcuate wall and the conduit. An internal baffle integral with one side of the intake opening extends between the arcuate wall and the conduit and forms a restricted passageway that increases the velocity of the incoming air at the upstream end of the arcuate wall. The internal baffle also forms a dust-receiving chamber at the downstream end of the arcuate wall, with the dust-receiving chamber communicating with the dust outlet for discharging dust from the housing. A suction fan withdraws air through the dust outlet so as to draw ambient air into the housing through the intake opening. The inlet to the dust-receiving chamber is spaced a substantial distance away from the innermost end of the restricted passageway so that the volume of the air passageway within the precleaner is increased between the restricted passageway and the dust-receiving chamber, thereby reducing the velocity of the air stream before it reaches the opening in the central conduit. The internal baffle is continuously spaced away from the central conduit to permit the relatively clean air that does not enter the opening in the conduit to recirculate around the conduit. The central conduit, the internal baffle, and the side and bottom walls of the housing are all formed as a single unitary molded plastic structure.

10 Claims, 5 Drawing Figures

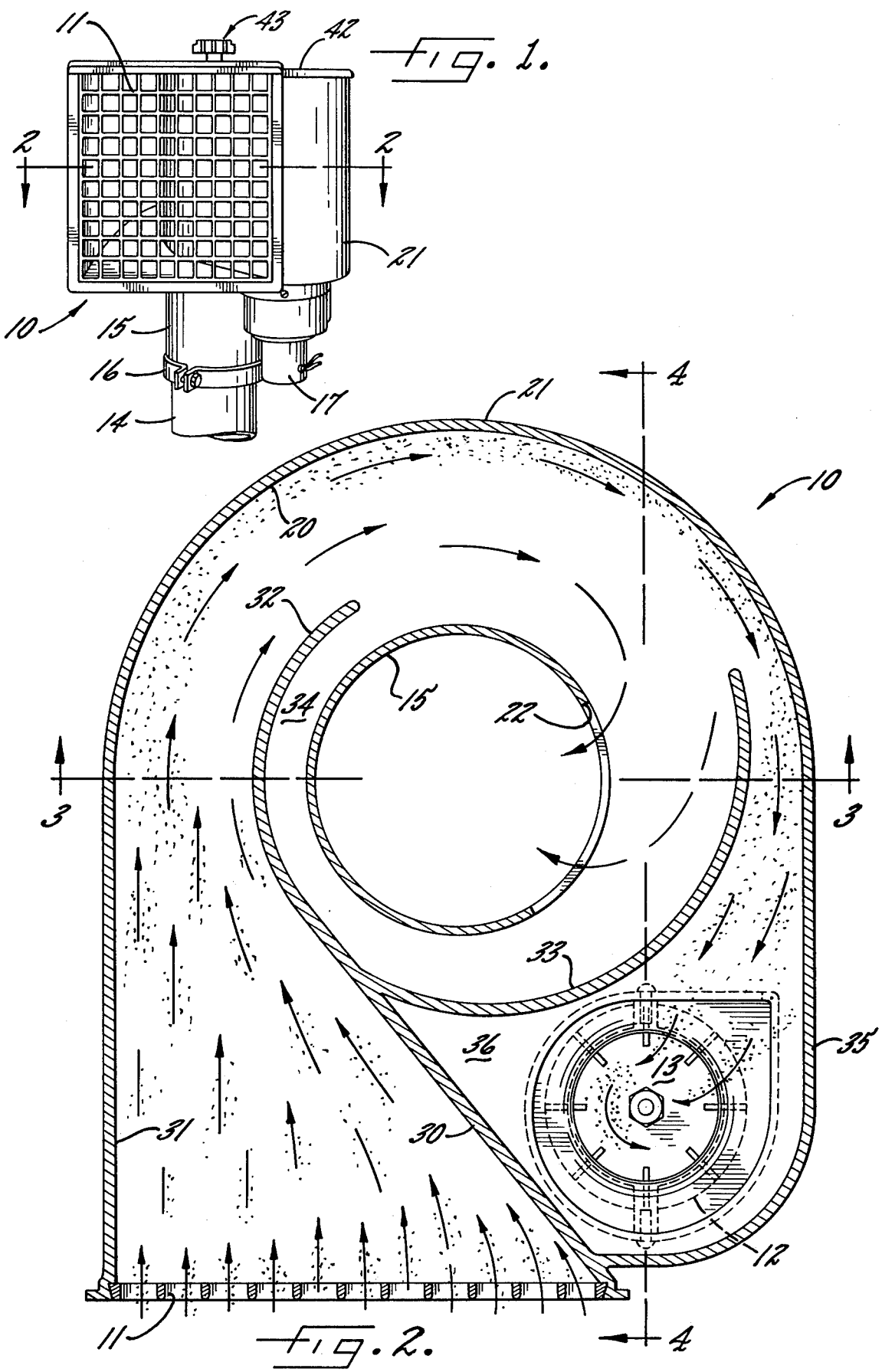

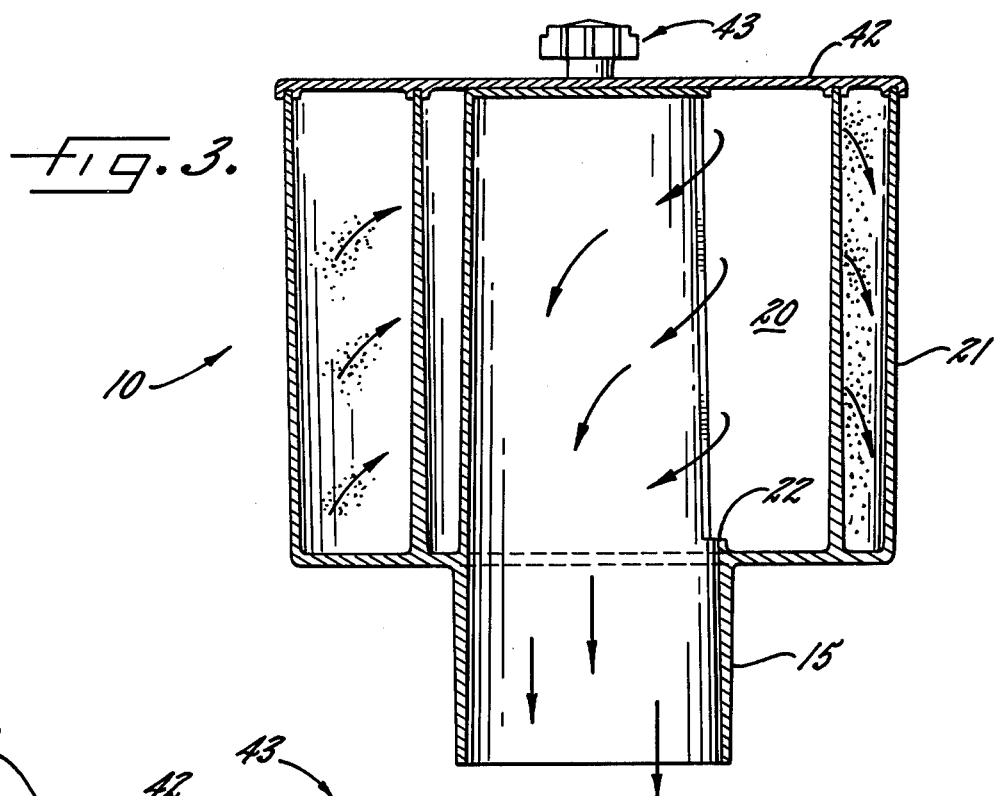
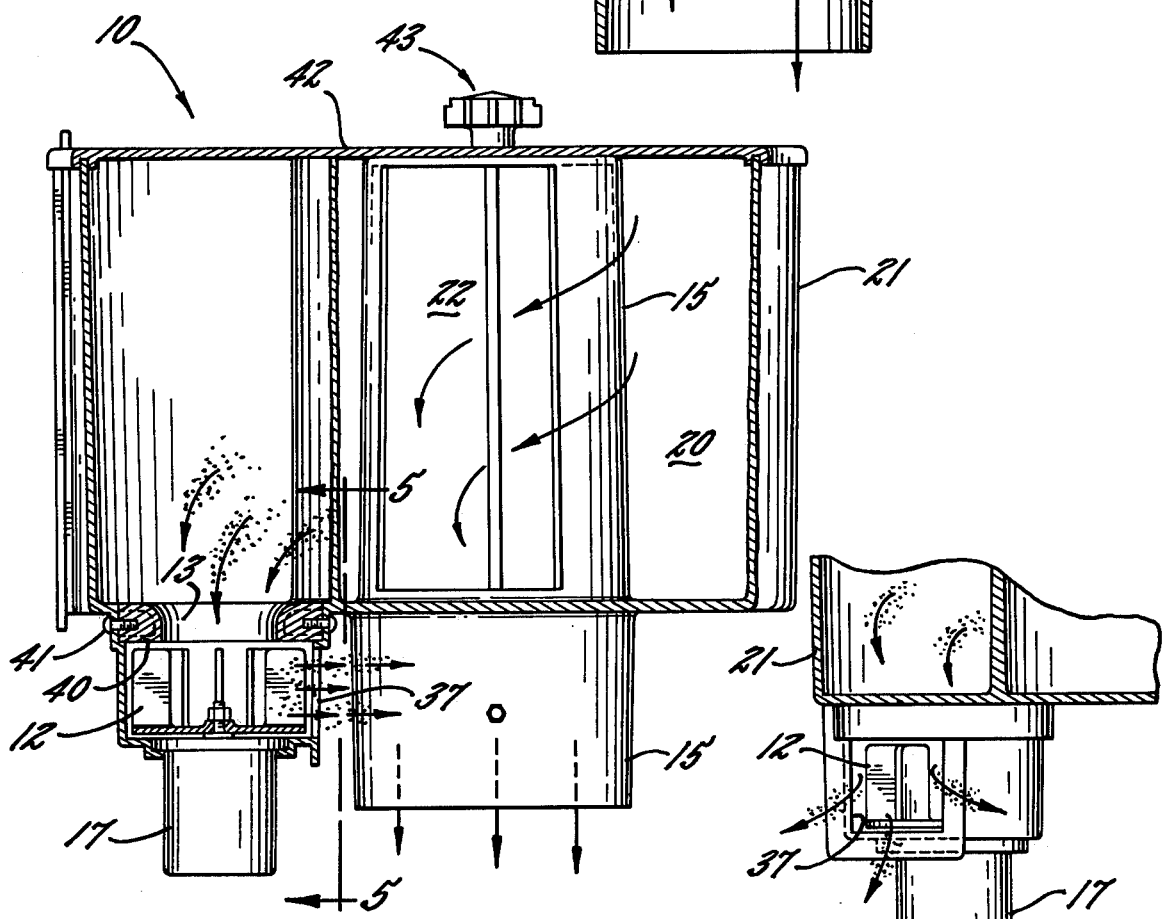

4,028,076

CENTRIFUGAL AIR PRECLEANER FOR INTERNAL COMBUSTION ENGINES

DESCRIPTION OF THE INVENTION

The present invention relates generally to air precleaners for internal combustion engines and, more particularly, to centrifugal type air precleaners.

Air precleaners of the centrifugal type are exemplified by the precleaner described in U.S. Pat. No. 3,792,573 to Lewis A. Borsheim, owned by the assignee of the present ivention. The Borsheim precleaner has been and still is manufactured commercially, but it is a relatively costly and complex structure to manufacture in mass production.

It is a primary object of the present invention to provide an improved centrifugal air precleaner that can be efficiently mass produced at a relatively low unit cost.

Another object of the invention is to provide such an improved centrifugal air precleaner that also offers improved performance.

A further object of the invention is to provide an improved centrifugal air precleaner of the foregoing type that is relatively compact.

Other objects and advantages of the invention will be apparent from the following detailed description and the accompanying drawings, in which:

FIG. 1 is a front elevation of a centrifugal air precleaner embodying the invention;

FIG. 2 is an enlarged section taken generally along line 2—2 in FIG. 1;

FIG. 3 is a section taken along line 3—3 in FIG. 2, on a reduced scale;

FIG. 4 is a section taken along line 4—4 of FIG. 2, on a reduced scale; and

FIG. 5 is a fragmentary elevation and partial section taken along line 5—5 in FIG. 4.

While the invention will be described in connection with a certain preferred embodiment, it will be understood that it is not intended to limit the invention to that particular embodiment. On the contrary, it is intended to cover all alternatives, modifications, and equivalents as may be included within the spirit and scope of the invention as defined by the appended claims.

Turning now to the drawings and referring first to FIGS. 1 and 2, there is shown a centrifugal air precleaner 10 which draws ambient air inwardly through an intake screen 11 by means of a suction fan 12 located at the dust outlet 13. Additional suction is provided by the air intake of the internal combustion engine to which the precleaner 10 supplies precleaned air via an air intake stack 14. The entire precleaner assembly is mounted on the stack by telescoping a depending central conduit 15 over the top of the stack 14 and then securing the conduit 15 to the stack 14 by means of a clamp 16. The suction fan 12 is driven by an electric motor 17 mounted alongside the conduit 15 and powered by the electrical system associated with the internal combustion engine served by the precleaner 10.

Within the precleaner 10, dust is removed from the incoming air by directing the air around a semi-cylindrical wall 20 formed by a housing 21. As used herein, it will be understood that the term "dust" refers to any solid contaminants or particulate material contained in the ambient air entering the precleaner. As the air flows around the semicylindrical wall 20, centrifugal action causes the dust to collect along the surface of the wall 20 so that it can be separated from the relatively clean air that remains in the central region of the precleaner. The relatively clean air is withdrawn from this central region through an opening 22 formed in the side of a vertical extension of the conduit 15 inside the precleaner. This clean air then passes down through the stack 14 to the air intake of the internal combustion engine.

In accordance with one important aspect of the present invention, the semi-cylindrical wall 20 of the housing 21 is substantially concentric with the central conduit 15, and an internal baffle integral with one side of the intake opening extends between the wall 20 and the conduit 15 to form a restricted passageway that increases the velocity of the incoming air at the upstream end of the wall 20, and to form a dust-receiving chamber at the downstream end of the wall 20. Thus, in the illustrative embodiment, the arcuate or semi-cylindrical wall 20 is substantially concentric with the central conduit 15. The internal baffle includes a planar section 30 which extends inwardly from one side edge of the intake screen 11 toward a planar section 31 of the housing side wall that is perpendicular to the opposite side edge of the intake screen 11. Thus, the two walls 30 and 31 form a converging restricted passageway that increases the velocity of the incoming air at the upstream end of the arcuate wall 20. This increase in the velocity of the incoming air stream is desirable to increase the centrifugal action which causes the dust in the incoming air to collect along the arcuate wall 20. As the planar section 30 of the entrance baffle approaches the upstream end of the annular chamber formed by the arcuate wall 20 and the conduit 15, the baffle is curved inwardly to form an arcuate section 32 which is substantially concentric with both the housing wall 20 and the central conduit 15. This curved section 32 of the internal baffle is spaced away from both the housing wall and the conduit 15, but is located much closer to the conduit 15 than to the housing wall 20. The effect of this curved section 32 of the internal baffle is to maintain the restricted passageway, and thus the relatively high velocity of the incoming air stream, along the first 60° of the semicylindrical wall 20 of the housing 21.

At the point where the curved section 32 of the internal baffle terminates, the air passageway expands to the full width of the annular chamber formed between the housing wall 20 and the central conduit 15. The air stream expands to fill this increased volume, with an attendant reduction in velocity, but the velocity is still sufficiently high to continue to carry the dust-laden air along the housing wall 20. Meanwhile, the reduced velocity and increased width of the air passageway facilitates entry of the relatively clean air from the inner region of the annular chamber into the discharged port of the conduit 15.

The remainder of the internal baffle structure forms an exit baffle 33 which splits the air stream into two components, namely an outer component heavily laden with dust and an inner component comprising relatively clean air. The exit baffle 33 is formed as an integral part of the entrance baffle, merging with the entrance baffle in the transition region where the planar section 30 joins the curved section 32. From the entrance baffle, the exit baffle 33 extends around the center conduit 15 in the form of an involute, so that the space between the conduit 15 and the exit baffle 33 gradually decreases in the direction of air flow. The terminus of the exit baffle 33 overlaps about the final 20° of the semi-cylindrical housing wall 20 at a radial position which has been found to represent the boundary between the dust-laden air in the outer region of the outer chamber and the relatively clean air in the inner region of that chamber. The clean air, of course, passes through the relatively wide space between the terminus of the exit baffle 33 and the conduit 15 and enters the port 22 for passage into the air intake stack 14. Any clean air that does not enter the port 22 passes on through a relatively narrow passageway 34 between the inner surface of the curved entrance baffle section 32 and the conduit 15 for recirculation within the annular chamber between the arcuate housing wall 20 and the conduit 15.

As the dust-laden air flows along the outer surface of the exit baffle 33, it enters a dust-receiving chamber defined by the outer surfaces of the exit baffle 33 and the planar section 30 of the entrance baffle, and a corner section 35 of the housing 21. As can be seen most clearly in FIG. 2, this dust-receiving chamber is completely sealed off from the rest of the precleaner so that the dust-containing air must exit through the dust outlet 13 formed in the bottom wall 36 of the housing within the dust-receiving chamber. Of course, the suction fan 12 located directly beneath this dust outlet 13 draws the dust out of the receiving chamber and discharges it to the atmosphere or a suitable receptacle, through a discharge port 37 (FIGS. 4 and 5). The dust-receiving chamber is preferably located at least 180° away from the air intake in the direction of air flow through the housing.

As can be seen most clearly in FIGS. 3 and 4, the conduit 15, the internal baffles 30, 32, and 33, and the bottom and side walls of the housing 21, including the depending housing for the suction fan 12 and the support flange for the drive motor 17, are all formed as a single unitary molded piece. The housing 21 and the internal baffles 30, 32 and 33 are all of substantially uniform height. A number of different materials may be used in molding this piece, but it is preferred to use a shock resistant material such as ABS plastic. In the particular embodiment illustrated, the dust outlet 13 is formed by an insert 40 seated on a flange formed just above the fan housing and held in place by plurality of screws 41. The use of this insert permits the motor 17 and fan 12 to be seated in their respective cavities from the open topped end of the cleaner. The insert 40 is then dropped into place, after which a separately molded cover 42 is applied to the housing and fastened by a screw 43. Thus, the entire precleaner assembly can be efficiently and economically manufactured from a small number of parts and requiring only a few simple assembly operations. It will be appreciated that the molding of the precleaner is facilitated by the use of baffles and side walls of uniform height throughout the precleaner.

In addition to facilitating manufacture, the precleaner provided by this invention also provides improved operating performance. To demonstrate this improved performance, a precleaner having the structure illustrated in the accompanying drawings was compared with a commercial precleaner embodying the invention of the aforementioned Borsheim U.S. Pat. No. 3,792,573. Both precleaners had a center conduit with a nominal 6-inch diameter. These two precleaners were tested according to the Society Of Automotive Engineers Air Cleaner Test Code J726b, feeding 990 grams of dust into each unit at a rate of 11 grams per miute at eight different flow rates. It was found that the Borsheim cleaner had an efficiency of 66.02%, while the precleaner of the present invention had an efficiency of 85.4%. Moreover, the precleaner of this invention also had significantly lower pressure drops, which is an important operating advantage because lower pressure drops provide improved fuel-air ratios which contribute to improved effficiency of the engine being served by the precleaner. More specifically, the pressure drops required to produce the eight different air flow rates in the comparative tests were as follows:

| Air Flow Rate | Pressure Drop (inches of water) | |
| (SCFM) | Borsheim | Present invention |
|---|---|---|
| 100 | .4 | .3 |
| 200 | 1.0 | .7 |
| 300 | 1.9 | 1.4 |
| 400 | 3.4 | 2.4 |
| 500 | 5.5 | 3.9 |
| 600 | 7.8 | 5.6 |
| 700 | 10.5 | 7.5 |
| 800 | 13.4 | 9.6 |

As can be seen from the above data, the precleaner of this invention produced the desired air flow rates at significantly lower pressure drops.

As can be seen from the foregoing detailed description, this invention provides an improved centrifugal air precleaner that can be efficiently mass produced at a relatively low unit cost. Furthermore, this precleaner offers improved performance, and it is also relatively compact.

I claim as my invention:

1. An air precleaner for internal combustion engines having air intakes, said precleaner comprising the combination of
   a. a conduit for conducting precleaned air to the air intake of the engine,
   b. a housing disposed around said conduit and having an air intake opening, an arcuate wall adjacent said intake opening and spaced radially outwardly from said conduit and substantially concentric therewith for conducting the incoming air stream from said intake opening circumferentially around said conduit so that any dust in said air stream is collected along the housing wall by centrifugal action, a pair of end walls attached to opposite ends of said arcuate wall, and a dust outlet for discharging dust from said housing at one end of said arcuate wall,
   said conduit having a clean air port near said one end of said arcuate wall for discharging clean air from the inner region of the space between said arcuate wall and said conduit, said conduit also having an open end which extends through one of the end walls of said housing,
   c. an internal baffle integral with said arcuate wall and extending between said arcuate wall and said conduit at said intake opening, said internal baffle forming a restricted passageway that increases the velocity of the incoming air at the other end of said arcuate wall and also forming a dust-receiving chamber at said one end of said wall, said dust-receiving chamber communicating with said dust outlet for discharging the dust from said housing, said internal baffle extending around a major portion of said conduit and spaced therefrom to form a recirculating passageway for recirculating any clean air that does not enter said clean air port around said conduit and back toward said clean air port without mixing said clean air with the incoming air in said restricted passageway, said internal baffle extending to a point such that the space between said arcuate housing wall and said conduit is uninterrupted between said restricted passageway and said dust receiving chamber so as to provide an enlarged chamber in which the velocity of the air stream is reduced to facilitate discharge of the clean air through said clean air port, and d. means for withdrawing air from said housing through said dust outlet so as to draw ambient air into said housing through said intake opening.

2. An air precleaner as set forth in claim 1 wherein the inlet to said dust-receiving chamber is spaced a substantial distance away from the inner end of said restricted passageway so that the volume of the air passageway within said housing is increased between said restricted passageway and said receiving chamber, thereby reducing the velocity of the air stream before it reaches said opening in said conduit.

3. An air precleaner as set forth in claim 1 wherein said conduit, said internal baffle and the arcuate wall and one end wall of said housing comprise a single unitary molded plastic structure.

4. An air precleaner as set forth in claim 1 wherein the inlet to said dust-receiving chamber is located at least 180° away from said air intake opening along the path of air flow through said housing.

5. An air precleaner as set forth in claim 1 wherein said housing and said internal baffle are of substantially uniform height.

6. An air precleaner for internal combustion engines having air intake stacks, said precleaner comprising the combination of a. a conduit for conducting precleaned air to the air intake stack of the engine, b. a housing positioned around said conduit so as to form an annular chamber, and also forming an air intake opening for admitting ambient air to said housing, the outer side wall of said annular chamber communicating with said intake opening and extending around said conduit for collecting any dust in the incoming air along the outer side wall of said annular chamber, a pair of end walls attached to opposite ends of said annular chamber, and an outlet for discharging dust from said chamber, c. an entrance baffle extending from one edge of said outer side wall and adjacent to said air intake opening into said chamber to form a restricted passageway that increases the velocity of incoming air between the housing outer side wall and the entrance baffle, said housing and said entrance baffle being arranged with respect to each other so as to conduct the incoming air circumferentially around said conduit so that any dust in said air stream is collected along the housing wall by centrifugal action, d. an internal baffle formed as an integral part of said entrance baffle and extending between said outlet and said conduit in said chamber to form a receiving chamber for dust flowing along the outer wall of said chamber whereby said dust is separated from relatively clean air flowing between said conduit and said internal baffle, one edge of said internal baffle cooperating with the wall of said housing to form a receiving chamber inlet spaced away from the restricted passageway formed by the entrance baffle, said receiving chamber communicating with said outlet for discharging the dust from said housing, e. said conduit having an opening adjacent said internal baffle for discharging relatively clean air from said housing and also having an open end which extends through one of the end walls of said housing, said internal baffle extending around a major portion of said conduit and spaced therefrom to form a recirculating passageway for recirculating any clean air that does not enter said clean air port around said conduit and back toward said clean air port without mixing said clean air with the incoming air in said restricted passageway, said internal baffle extending to a point such that the space between said arcuate housing wall and said conduit is uninterrupted between said restricted passageway and said dust receiving chamber so as to provide an enlarged chamber in which the velocity of the air stream is reduced to facilitate discharge of the clean air through said clean air port, f. and means for withdrawing air from said annular chamber through said dust outlet so as to drawn ambient air into said annular chamber through said intake opening.

7. An air precleaner as set forth in claim 6 wherein said conduit and the annular chamber formed by said housing are substantially concentric with each other.

8. An air precleaner as set forth in claim 6 wherein the inlet to said receiving chamber is spaced a substantial distance away from the inner end of said entrance baffle so that the volume of the air passageway in said annular chamber is increased between said restricted passageway and said receiving chamber, thereby reducing the velocity of the air stream before it reaches said opening in said conduit.

9. An air precleaner as set forth in claim 6 wherein said conduit, said baffles and the side wall and one end wall of said housing comprise a single unitary molded plastic structure.

10. An air precleaner as set forth in claim 6 wherein the inlet to said receiving chamber is located at least 180° away from said air intake opening along the path of air flow through said annular chamber.

* * * * *